United States Patent
Jeong

(10) Patent No.: US 7,410,188 B2
(45) Date of Patent: Aug. 12, 2008

(54) APPARATUS FOR MOUNTING DRIVER-SIDE AIRBAG MODULE IN VEHICLE

(75) Inventor: Eon Jae Jeong, Busan Metropolitan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 98 days.

(21) Appl. No.: 11/304,923

(22) Filed: Dec. 14, 2005

(65) Prior Publication Data

US 2007/0080520 A1    Apr. 12, 2007

(30) Foreign Application Priority Data

Oct. 6, 2005    (KR) .................... 10-2005-0093966

(51) Int. Cl.
  *B60R 21/16*    (2006.01)
  *B60R 21/203*    (2006.01)
(52) U.S. Cl. .................... 280/728.2; 280/731
(58) Field of Classification Search .............. 280/728.2, 280/731
  See application file for complete search history.

(56) References Cited

U.S. PATENT DOCUMENTS

| 5,046,757 | A | * | 9/1991 | Sadler et al. ................ 280/731 |
| 5,470,098 | A | * | 11/1995 | Szigethy et al. ............ 280/728.2 |
| 6,276,711 | B1 | * | 8/2001 | Kurz et al. ................. 280/728.2 |
| 6,474,682 | B2 | * | 11/2002 | Ikeda et al. .................... 280/731 |
| 6,554,312 | B2 | * | 4/2003 | Sakane et al. .............. 280/728.2 |
| 6,688,638 | B2 | * | 2/2004 | Schutz ..................... 280/728.2 |
| 7,097,197 | B2 | * | 8/2006 | Keutz et al. ............... 280/728.2 |
| 7,185,915 | B2 | * | 3/2007 | Fujita et al. .................. 280/731 |
| 2001/0054810 | A1 | * | 12/2001 | Sakane et al. ............. 280/728.2 |
| 2004/0056453 | A1 | * | 3/2004 | Marath et al. ............. 280/728.2 |

FOREIGN PATENT DOCUMENTS

JP    03-082249    4/1991
JP    08-072664    3/1996

* cited by examiner

*Primary Examiner*—Eric Culbreth
*Assistant Examiner*—Joseph Rocca
(74) *Attorney, Agent, or Firm*—Morgan Lewis & Bockius LLP

(57) ABSTRACT

Disclosed is an apparatus for mounting a driver-side airbag module in a vehicle, capable of easily assembling the driver-side airbag module with a steering wheel by using a link, a hook and a bolt without rotating the driver-side airbag module. The apparatus includes a module bracket installed on a base plate of a steering wheel, a link movably coupled with the module bracket in such a manner that the link moves in a left or right direction at an upper portion of the module bracket, a hook hinged to one side of the module bracket and the link, a bolt coupling unit installed in opposition to the hook in order to control a movement of the link in the left or right direction, and a mounting plate mounted on the module bracket by means of the hook and the bolt coupling unit.

12 Claims, 5 Drawing Sheets

APPARATUS FOR MOUNTING DRIVER-SIDE AIRBAG MODULE IN VEHICLE

CROSS-REFERENCE TO RELATED APPLICATION

This application claims priority to and the benefit of Korean Patent Application 10-2005-0093966 filed in the Korean Intellectual Property Office on Oct. 6, 2005, the entire content of which is incorporated herein by reference.

BACKGROUND OF THE INVENTION

The present invention relates to an apparatus for mounting a driver-side airbag module in a vehicle. More particularly, the present invention relates to an apparatus for mounting a driver-side airbag module in a vehicle, which can easily assemble the driver-bag side airbag module with a steering wheel without forming a gap therebetween.

DESCRIPTION OF THE RELATED ART

In general, vehicles are usually equipped with driver-side airbag module, which deploys toward driver when a vehicle accident occurs in order to protect upper parts of the body and the face of the driver. Typically, an airbag module is installed in a steering wheel by means of bolts 3.

After mounting the airbag module on the steering wheel, a bolt is screw-coupled into one side of the airbag module and the steering wheel. Then, the steering wheel must be rotated by an angle of 180° and another bolt is screw-coupled into the other side of the airbag module and the steering wheel. Alternatively, the second bolt is screw-into coupled into the other side of the airbag module and the steering wheel by moving a tool to the other side of the airbag module assembling line. However, the airbag module may cause problems because the airbag module may rotate if a strong force is applied to the bolt when the bolt is screw-coupled into one side of the airbag module and the steering wheel. In this case, a gap is formed between the steering wheel and the airbag module, thereby causing the misalignment between airbag module and the steering wheel.

In addition, the conventional coupling scheme increases assembling steps while complicating the assembling process for the airbag module.

SUMMARY OF THE INVENTION

The present invention provides an apparatus for mounting a driver-side airbag module in a vehicle, which can easily assemble the driver-side airbag module with a steering wheel by using a link, a hook and a bolt without rotating the driver-side airbag module. In one exemplary embodiment, the apparatus includes: a module bracket installed on a base plate of a steering wheel; a link movably coupled with the module bracket in such a manner that the link moves in a left or right direction at an upper portion of the module bracket; a hook hinged to one side of the module bracket and the link; a bolt coupling unit installed in opposition to the hook in order to control a movement of the link in the left or right direction; and a mounting plate mounted on the module bracket by means of the hook and the bolt coupling unit.

According to an exemplary embodiment of the present invention, the module bracket includes a guide groove extending in a horizontal direction, a pair of coupling members protruding upward from one side of the guide groove such that a hinge pin is installed therebetween, and a support member protruding from a center portion of the guide groove with a T-shaped structure. In addition, an interval between a bottom portion of the guide groove and both upper end portions of the T-shaped support member may be determined according to a thickness of the link. The link preferably includes a sidewall for installing the bolt coupling unit, a hinge groove in which the hook is hinged to the link, a coupling hole formed at both sidewalls of the hinge groove such that the hook is hinged to the link through a coupling pin inserted into the coupling hole, and a guide hole allowing the link coupled with the support member to move in the left or right direction.

According to the exemplary embodiment of the present invention, the hook is hinged to the coupling member by means of the hinge pin and is hinged to the link in the hinge groove by means of the coupling pin. The bolt coupling unit includes a guide member for guiding a bolt into the bolt coupling unit and a nut member coupled with the link so as to screw-couple the bolt into the link.

The mounting plate is formed at a first side thereof with a second screw hole into which the bolt is screw-coupled by means of the bolt coupling unit and is formed at a second side thereof with a locking hole, which is inclined downward and into which the hook is inserted. At this time, the second screw hole of the mounting plate is located in a predetermined position corresponding to the inside of the sidewall of the link. In addition, the link is moved in the left or right direction by a bolt, which is screw-coupled into the link by means of the bolt coupling unit.

The hook may be formed with a slot in order to prevent interference between a linear movement of the link and a rotational movement of the hook. The rotation of the hook is controlled according to a coupling state a bolt with respect to the link and a movement of the link in the left or right direction.

BRIEF DESCRIPTION OF THE DRAWING

The above and other features and advantages of the claimed invention will be more apparent from the following detailed description taken in conjunction with the accompanying drawings.

DESCRIPTION OF THE PREFERRED EMBODIMENTS

Figure 1:
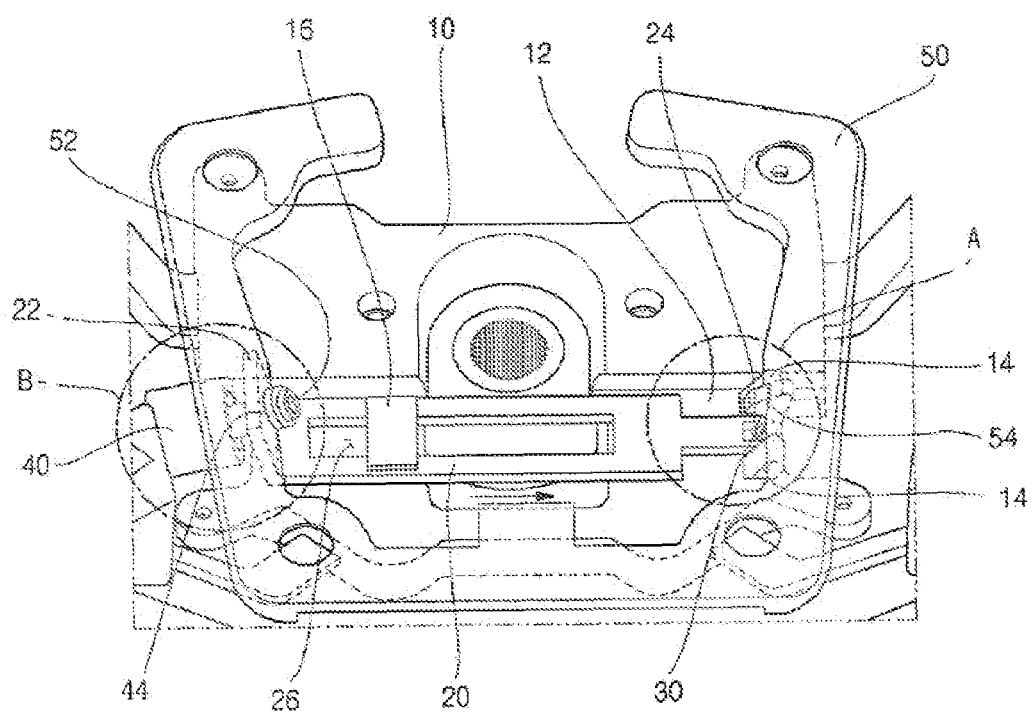
FIG. 1 is a perspective view illustrating an airbag module assembled with a steering wheel according to one embodiment of the present invention.

Hereinafter, embodiments of an apparatus for mounting an airbag module in a vehicle according to the present invention will be described with reference to the accompanying drawings. In the following description and drawings, the same reference numerals are used to designate the same or similar components, so repetition of the description the same or similar components will be omitted.

Figure 2:
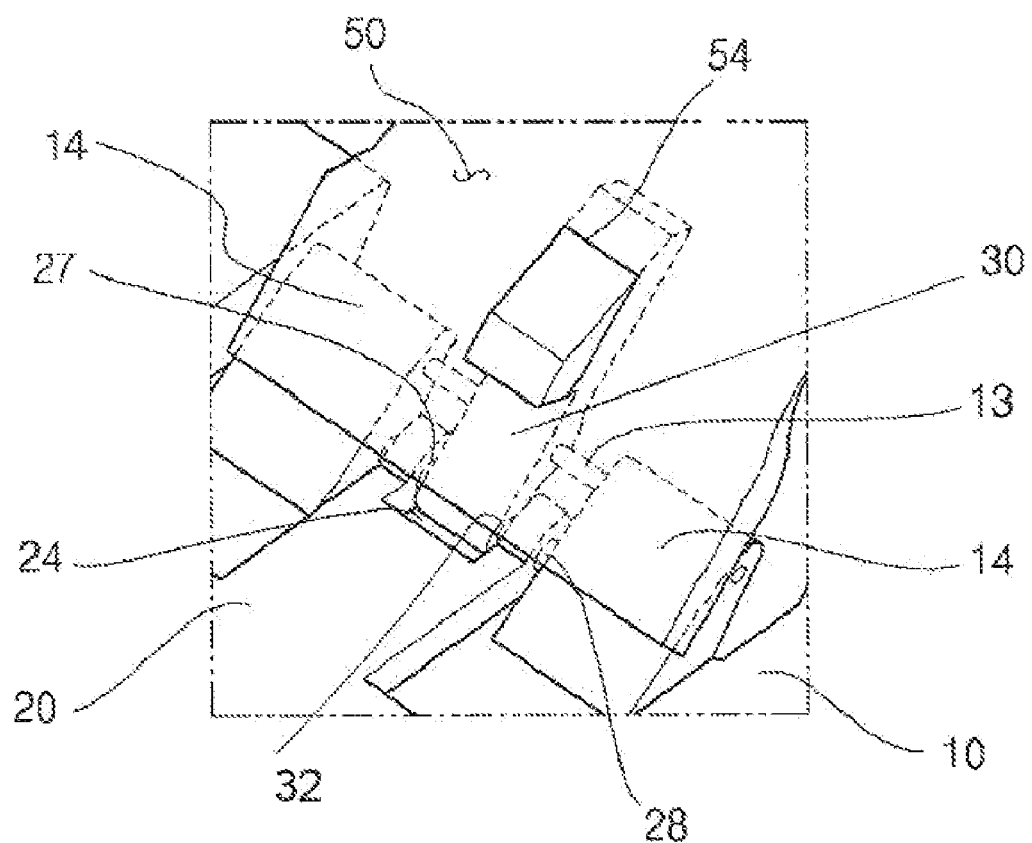
FIG. 2 is an enlarged view of an "A" portion shown in FIG. 1.

Referring to FIG. 1 and FIG. 2 an apparatus for assembling an airbag module with he steering wheel in one embodiment include a module bracket 10, a link 20, a hook 30, a bolt coupling unit 40 and a mounting plate 50.

The module bracket 10 is installed on a base plate (not shown) of the steering wheel and includes a guide groove 12, a pair of coupling members 14 and a support member 16, all of which are used to install the link 20 and the hook 30 on the module bracket 10, so that the mounting plate 50 can be coupled with the module bracket 10 by means of the link 20 and the hook 30. The guide groove 12 is horizontally formed at a rear portion of the module bracket 10 with a predetermined depth so as to facilitate the horizontal movement of the link 20. The pair of coupling members 14 may protrude upward from one side of the guide groove 12 while being spaced apart from each other by a predetermined distance.

Herein, as shown in FIG. 2, which is an enlarged view of an "A" portion shown in FIG. 1, a hinge pin 13 is installed between the pair of coupling members 14 and the hook 30 is hinged to the coupling members 14 through the hinge pin 13. The support member 16 protrudes from the center portion of the guide groove 12 in the T-shaped structure in order to guide the link 20 in the left or right direction while preventing the link 20 from being separated from the module bracket 10. Thus, an interval between a bottom portion of the guide groove 12 and both upper end portions of the T-shaped support member 16 is determined according to the thickness of the link 20. The interval is properly selected such that the link 20 can be easily moved in the left or right direction without being separated from the guide groove 12.

Figure 3:
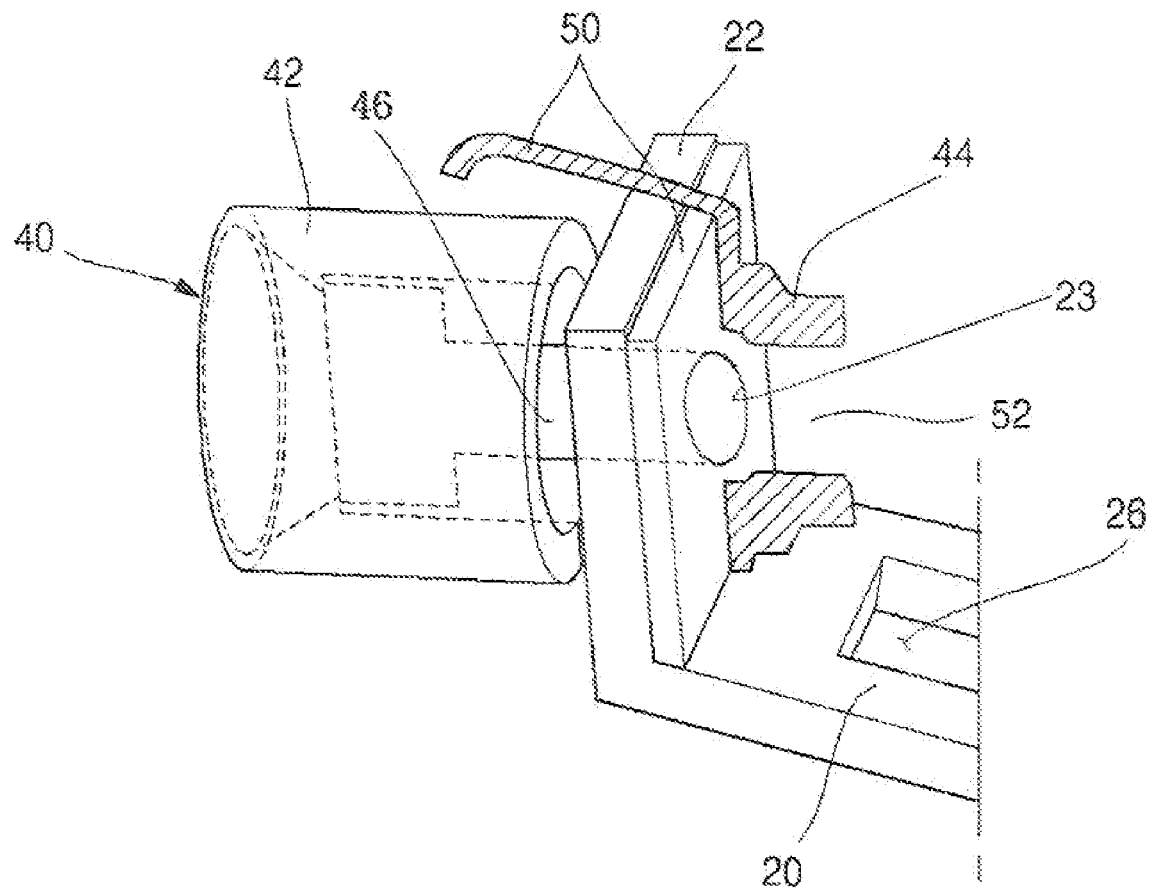
FIG. 3 is an enlarged view of a "B" portion shown in FIG. 1.

The link 20 is movably coupled with the guide groove 12 formed at the upper portion of the module bracket 10 such that the link 20 can move in the left or right direction within the guide groove 12. The link 20 includes a sidewall 22, a hinge groove 24, a guide hole 26 and a coupling hole 27. The sidewall 22 protrudes upward from one end of the link 20. As shown in FIG. 3, which is an enlarged view of a "B" portion shown in FIG. 1, the bolt coupling unit 40 is coupled to an outer portion of the sidewall 22. In addition, a first screw hole 23 is formed at the center of the sidewall 22 in such a manner that a nut member 44 of the bolt coupling unit 40 can be screw-coupled into the first screw hole 23. Therefore, the link 20 moves in the left or right direction as a bolt coupled to the link 20 is rotated in the forward or reverse direction by means of the bolt coupling unit 40, thereby coupling the hook 30 with a locking hole 54 of the mounting plate 50 or releasing the hook 30 from the locking hole 54 of the mounting plate 50. In addition, the first screw hole 23 formed at the center portion of the sidewall 22 corresponds to a second screw hole 52 formed at one side of the mounting plate 50 (see, FIGS. 1 and 4).

The hinge groove 24 preferably has a size, which is sufficient for allowing the hook 30 to rotate within the hinge groove 24. The guide hole 26 provides a space for allowing the link 20 coupled with the support member 16 to move in the left or right direction. The coupling hole 27 is formed at both sidewalls of the hinge groove 24 and a coupling pin 28 is inserted into the coupling hole 27 such that the hook 30 can be hingedly installed in the hinge groove 24 by means of the coupling pin 28 (see, FIG. 2).

Figure 4:
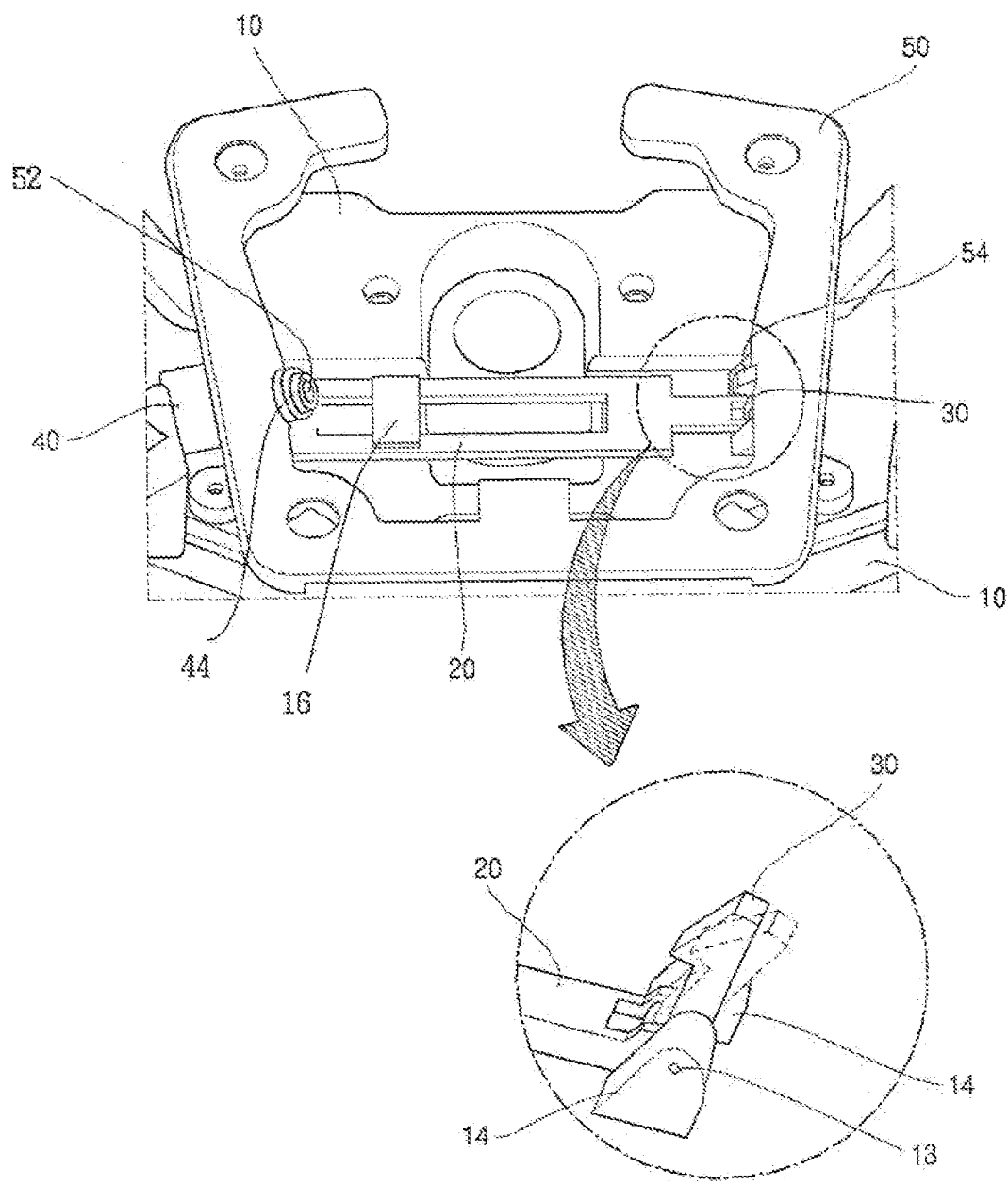
FIG. 4 is a perspective view illustrating an airbag module assembled with a steering wheel according to one embodiment of the present invention, in which a mounting plate is coupled with a module bracket.

The hook 30 is hinged to one side of the module bracket 10 and to one side of the link 20, respectively. That is, the hook 30 is hinged to the coupling members 14 of the module bracket 10 through the hinge pin 13 and is hinged to the link 20 in the hinge groove 24 through the coupling pin 28. In addition, as shown in FIG. 4 illustrating the coupling state between the mounting plate 50 and the module bracket 10, the hook 30 is formed with a slot 32 in order to prevent interference between the linear movement of the link 20 and the rotational movement of the hook 30. Therefore, when the link 20 is moved in the right direction by means of the bolt, the upper end portion of the hook 30 is inserted into the locking hole 54 formed at one side of the mounting plate 50, so that the module bracket 10 of the steering wheel 10 can be securely coupled with the mounting plate 50 of the airbag module.

The bolt coupling unit 40 is coupled to the outer portion of the sidewall 22 of the link 20 in opposition to the hook 30 and includes a guide member 42 and the nut member 44. The guide member 42 of the bolt coupling unit 40 guides the bolt 46 in such a way that the bolt 46 can be easily inserted into a nut hole formed in the nut member 44 of the bolt coupling unit 40. The nut member 44 connects the guide member 42 with the sidewill 22 of the link 20 and couples the link 20 with the mounting plate 50 by using the bolt 46 inserted into the nut member 44. As the bolt 46 rotates in the forward direction by means of the bolt coupling unit 40, that is, as the bolt is 46 is screw-coupled into the first screw hole 23 formed in the sidewall 22 of the link 20, the link 20 moves in the right direction so that the hook 30 installed in opposition to the sidewall 22 of the link 20 is inserted into the locking hole 54 of the mounting plate 50. In contrast, as the bolt rotates in the reverse direction by means of the Colt coupling unit 40, that is, as the bolt 46 is released from the first screw hole 23 formed in the sidewall 22 of the link 20, the link 20 moves in the left direction so that the hook 30 is released from the locking hole 54 of the mounting plate 50, thereby disassembling the mounting plate 50 front the link 20.

The mounting plate 50 is prepared to install the airbag in the steering wheel. The mounting plate 50 is coupled with the link 20 by means of the bolt coupling unit 40 and is mounted on the module bracket 10. The mounting plate 50 is formed at one end portion thereof with the screw hole 52 into which the bolt is screw-coupled by means of the bolt coupling unit 40. The screw hole 52 is located in a predetermined position corresponding to the inside of the sidewall 22 of the link 20 so that the screw hole 52 may restrict the movement of the link 20 when the link 20 moves in the right direction. The mounting plate 50 is formed at the other end portion thereof with the locking hole 54, which is inclined downward and into which the hook 30 is inserted when the link 20 moves in the right direction.

Figure 5:
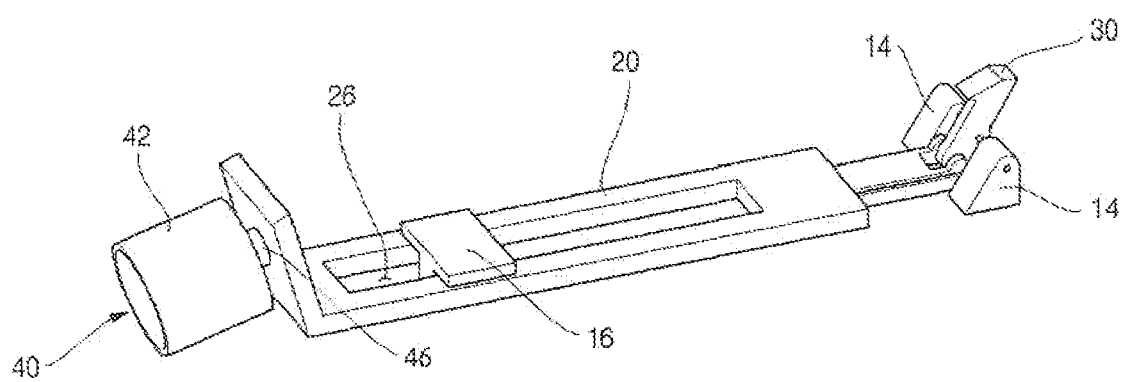
FIG. 5 is a perspective view illustrating an airbag module assembled with a steering wheel according to one embodiment of the present invention, in which a link moves in the right direction as a bolt is screw-coupled into the link.

Hereinafter, the operation of the apparatus for mounting the airbag module in the vehicle according to the present invention will be briefly described with reference to FIGS. 4 and 5.

Referring to FIG. 4, after the mounting plate 50 of the airbag module has been mounted on the module bracket 10 of the steering wheel, the bolt 46 is screw-coupled into the link 20, so that the link 20 moves toward the mounting plate 50 of the airbag module. If the link 20 moves in the right direction, as shown in FIG. 5, the hook 30 installed in opposition to the link 20 is rotated so that the hook 30 is inserted into the locking hole 54 formed at one sue of the mounting plate 50. Thus, the mounting plate 50 of the airbag module can be fixedly mounted on the module bracket 10 of the steering wheel according to the coupling action of the bolt 46 with respect to the link 20 and the locking action of the hook 30 with respect to the locking hole 54. In contrast, it is necessary to release the mounting plate of the airbag module from the module bracket 10 of the steering wheel, the user releases the bolt 46 by rotating the bolt 46 in the reverse direction. As the bolt 46 rotates in the reverse direction, the link 20 moves in the left direction so that the book 30 is released from the locking hole 54 of the mounting plate 50.

The apparatus for mounting the airbag module in the vehicle according to present invention has advantages as follows:

First, the number of special bolts used for coupling the mounting plate of the airbag module to the module bracket of the steering wheel can be reduced, so that the assembling cost for the airbag module may be reduced.

Second, the surface of the hook serves as a guide when the mounting plate of the airbag module is coupled with the module bracket of the steering wheel, so that the airbag module can be prevented from rotating and the gap is not formed between the airbag module and the steering wheel when they have been assembled with each other.

Third, after bolting work has been completed with respect to one side of the steering wheel, it is not necessary to rotate the steering wheel or to move the tool into the other side of the steering wheel for another bolting work, so that the assembling steps can be reduced.

Although a preferred embodiment of the present invention has been described for illustrative purposes, those skilled in the art will appreciate that various modifications, additions and substitutions are possible, without departing from the scope and of spirit of the invention as disclosed in the accompanying claims.

What is claimed is:

1. An apparatus for mounting a driver-side airbag module in a vehicle, the apparatus comprising:
   a module bracket installed on a base plate of a steering wheel;
   a link movably coupled with the module bracket in such a manner that the link moves in a left or right direction at an upper portion of the module bracket;
   a hook hinged to one side of the module bracket and the link;
   a bolt coupling unit installed in opposition to the hook in order to control a movement of the link in the left or right direction; and
   a mounting plate mounted on the module bracket by means of the hook and the bolt coupling unit.

2. The apparatus as claimed in claim 1, wherein the module bracket includes a guide groove extending in a horizontal direction, a pair of coupling members protruding upward from one side of the guide groove such that a hinge pin is installed therebetween, and a support member protruding from a center portion of the guide groove with a T-shaped structure.

3. The apparatus as claimed in claim 2, wherein an interval between a bottom portion of the guide groove and both upper end portions of the T-shaped support member is determined according to a thickness of the link.

4. The apparatus as claimed in claim 2, wherein the link includes a sidewall for installing the bolt coupling unit, a hinge groove in which the hook is hinged to the link a coupling hole formed at both sidewalls of the hinge groove such that the hook is hinged to the link through a coupling pin inserted into the coupling hole, and a guide hole allowing the link coupled with the support member to move in the left or right direction.

5. The apparatus as claimed in claim 1 or 2, wherein the link includes a sidewall for installing the bolt coupling unit, a hinge groove in which the hook is hinged to the link, a coupling hole formed at both sidewalls of the hinge groove such that the hook is hinged to the link through a coupling pin inserted into the coupling hole, and a guide hole allowing the link coupled with the support member to move in the left or right direction.

6. The apparatus as claimed in claim 5, wherein the hook is hinged to the coupling member by means of the hinge pin and is hinged to the link in the hinge groove by means of the coupling pin.

7. The apparatus as claimed in claim 1, wherein the bolt coupling unit includes a guide member for guiding a bolt into the bolt coupling unit and a nut member coupled with the link so as to screw-couple the bolt into the link.

8. The apparatus as claimed in claim 1, wherein the mounting plate is formed at a first side thereof with a second screw hole into which the bolt is screw-coupled by means of the bolt coupling unit and is formed at a second side thereof with a locking hole, which is inclined downward and into which the hook is inserted.

9. The apparatus as claimed in claim 8, wherein the second screw hole of the mounting plate is located in a predetermined position corresponding to an inside of the sidewall of the link.

10. The apparatus as claimed in claim 1, wherein the link is moved in the left or right direction by a bolt, which is screw-coupled into the link by means of the bolt coupling unit.

11. The apparatus as claimed in claim 1, wherein the hook is formed with a slot in order to prevent interference between a linear movement of the link and a rotational movement of the hook.

12. The apparatus as claimed in claim 1, wherein a rotation of the hook is controlled according to a coupling state of a bolt with respect to the link and a movement of the link in the left or right direction.

* * * * *